June 29, 1965  H. REIFEL ETAL  3,192,456
VIBRATORY CAPACITORS
Filed Jan. 27, 1961  3 Sheets-Sheet 1

Harry Reifel + Gerald Karon
Inventors
by Robert J. Palmer
Attorney

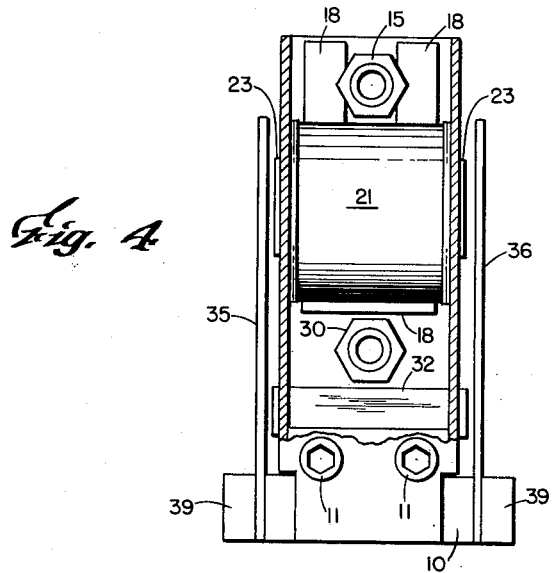
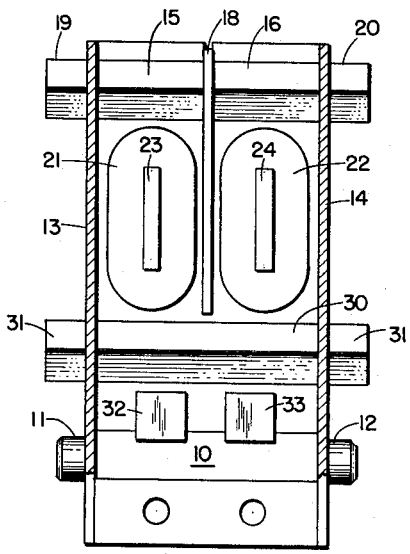
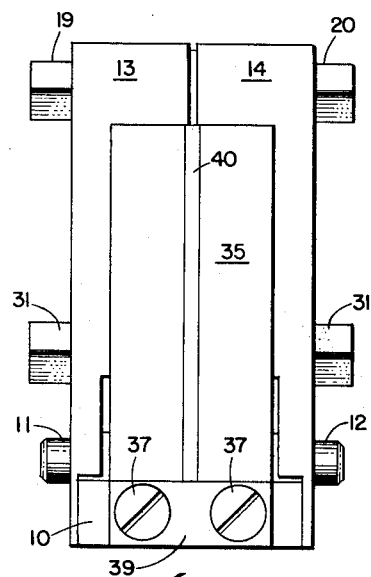

June 29, 1965

H. REIFEL ETAL 3,192,456

VIBRATORY CAPACITORS

Filed Jan. 27, 1961

Harry Reifel + Gerald Karon
Inventors
by Robert T. Palmer
Attorney

United States Patent Office

3,192,456
Patented June 29, 1965

3,192,456
VIBRATORY CAPACITORS
Harry Reifel, Waltham, and Gerald Karon, Randolph, Mass., assignors to Stevens-Arnold Inc., Boston, Mass.
Filed Jan. 27, 1961, Ser. No. 85,416
3 Claims. (Cl. 317—250)

This invention relates to vibratory capacitors such as are used as choppers for converting small direct currents into proportional alternating currents.

It is well known that when a direct current voltage is placed across a pair of plates of a capacitor, and one of the plates is vibrated, an alternating current voltage which is proportional to the direct current voltage, will be produced across the plates. This alternating current voltage can be amplified in a stable, A.C. amplifier.

Heretofore, a single, cantilever-supported reed of spring metal has been used as the vibratory plate of such a chopper, and to prevent the vibrations of the reed from vibrating the chopper, it has been necessary to mount the reed on a heavy, metal base plate, and to enclose the chopper within a large, heavy, metal casting.

This invention prevents the vibration of such a chopper by using oppositely positioned reeds which like the prongs of a tuning fork, vibrate out-of-phase, so that the vibrations which would be transmitted by one reed are balanced out by the vibrations from the other reed. This not only permits lighter and less expensive mountings and enclosures to be used, but combines two choppers in a single assembly which is much smaller, lighter and less expensive than two separate choppers.

Another feature of this invention is that it forms the coupling capacitor which is required for coupling such a chopper to the control electrode of an electronic amplifier, as a part of the chopper.

Objects of this invention are to reduce the mass and cost of vibratory capacitors.

Another object of this invention is to reduce the vibrations transmitted to a vibratory capacitor by a vibrating plate.

Another object of this invention is to form a coupling capacitor as part of a vibratory capacitor.

This invention will now be explained with reference to the annexed drawings, of which:

FIG. 4 is a side view of the two vibratory plates of the chopper, and of one of their electromagnets, with the support for the electromagnets shown in section;

FIG. 5 is an end view of FIG. 4 with the adjacent vibratory plate removed, and with the support for the electromagnets shown in section;

FIG. 6 is an end view similar to FIG. 4 but with no sections, and with the adjacent vibratory plate in place.

Figure 1:
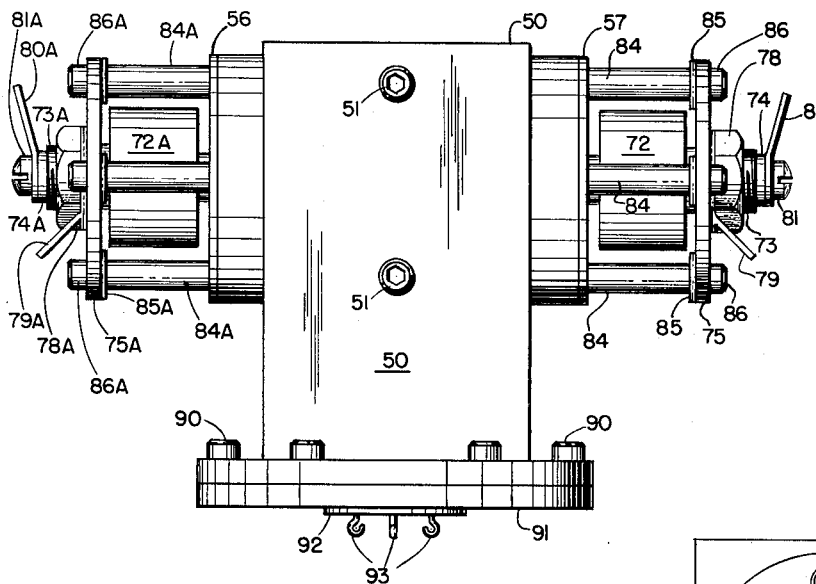
FIG. 1 is a side view of a chopper embodying this invention.

A support block 10 of electric insulation has attached thereto by screws 11 and 12, the lower ends of brass supports 13 and 14 respectively, which are generally U-shaped in section. Extending between the supports 13 and 14 near their tops are spacer bars 15 and 16 between which extend the upper end of a magnetic shield plate 18. The bar 16 has an inner end threaded into a tapped opening in the inner end of the bar 15 and which extends through a recess in the upper portion of the shield plate 18, the latter being clamped between the bars 15 and 16. The bars 15 and 16 have threaded outer ends which extend through openings in the supports 13 and 14 respectively, and on which are threaded nuts 19 and 20 respectively.

A pair of electromagnets 21 and 22 are clamped between the supports 13 and 14 just below the spacer bars 15 and 16, and which have pole-pieces 23 and 24 respectively, which extend through openings in opposite sides of the supports 13 and 14. The shield plate 18 extends between the electromagnets 21 and 22.

Below the lower end of the shield plate 18, a spacer bar 30 extends between the supports 13 and 14, and has threaded outer ends which extend through openings in the supports, and on which are threaded nuts 31.

Below the spacer bar 30 is a pair of spaced-apart, parallel, permanent magnet bars 32 and 33 which extend parallel to the polepieces 23 and 24 respectively. The magnet bars 32 and 33 are cemented in recesses in the top of the block 10, and their ends are in vertical alignment with corresponding ends of the pole-pieces 23 and 24 respectively.

Vibratory capacitor plates 35 and 36 of magnetic spring metal are clamped at their lower ends by screws 37 and clamp blocks 39 to opposite sides of the block 10. The plates 35 and 36 are parallel, and spaced from corresponding ends of the pole-pieces 23 and 24 respectively, and of the magnet bars 32 and 33 respectively. The plates 35 and 36 have non-magnetic inserts 40 such as brass, extending along their centerlines.

The assembly described in the foregoing is inserted within the interior of a cast aluminum housing 50, and its supports 13 and 14 are secured to the housing 50 by screws 51 which are threaded into tapped openings in the nuts 19, 20 and 31.

The housing 50 has circular openings in its opposite sides opposite the upper portions of the capacitor plates 35 and 36, and electric insulators 54 and 55 are secured in such openings against rubber rings 52 and 53 respectively, by annular rings 56 and 57 respectively, which are attached to the housing 50 by spacers 84 which have inner ends threaded into tapped openings 58. Threaded sleeves 60 and 61 are fitted in circular openings in the insulators 54 and 55 respectively, and have flanges 62 and 63 respectively, on their inner ends against the inner sides of the inuslators 54 and 55 respectively. Fixed capacitor plates 64 and 65 are on the inner ends of rods 66 and 67 respectively, which are threaded into the sleeves 56 and 57 respectively. Coiled springs 68 and 69 extend around the rods 66 and 67 respectively, between the flanges 62 and 63 respectively, and the plates 64 and 65 respectively.

The capacitor plates 35 and 64 are the plates of one chopper unit, and the capacitor plates 36 and 65 are the plates of the other chopper unit.

Figure 7:
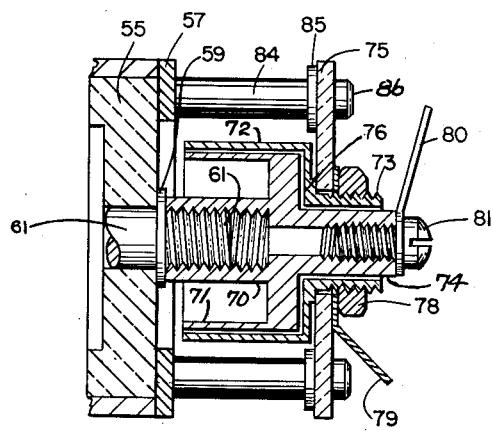
FIG. 7 is an enlarged side view, in section, of one of the coupling capacitors of the chopper.

As shown by FIG. 7, the sleeve 61 has threaded thereon, cylindrical, internally threaded portion 70 of metal, inner, coupling capacitor cup 71 which is threaded up against the outer side of a washer 59, the inner side of which is against the outer side of the insulator 55. The spring 69 presses the insulator 55 against the ring 57 and the washer 59. Metal, outer, coupling capacitor cup 72 extends around the cup 71 and is spaced therefrom. The cup 72 has an outer, threaded portion 73 which has a central clearance opening through which extends cylindrical, internally threaded portion 74 of the cup 71. A disc 75 of electric insulation has a central circular opening and is clamped around its opening against shoulder 76 of the cup 72 by nut 78 which is threaded onto the cup 73 against the disc 75 with an annular portion of metal terminal strip 79 therebetween. Another terminal strip 80 has an annular portion clamped between the outer end of the cup portion 74 and the head of a screw 81 which is threaded into the cup portion 74. The disc 75 is attached to the outer ends of the spacers 84 by lock washers 85 and screws 86.

Figure 3:
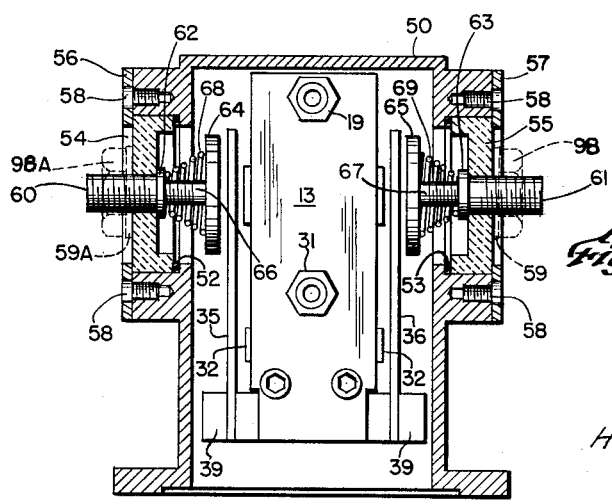
FIG. 3 is an end section of the chopper less its base and base terminals.

The cups 71 and 72 form the two capacitor elements of a coupling capacitor having air as its dielectric, for coupling the right chopper unit of FIGS. 1, 3 and 4 to a source of D.C. signals, and to the control electrode of an electronic amplifier. The D.C. signal source would be connected to the terminal strip 80 and to ground. The terminal strip 79 would be connected to the control electrode of the amplifier which would have another electrode connected to ground. The vibratory capacitor plate 36 of that chopper unit would be connected directly to ground or through a low impedance to ground.

The coupling capacitor so provided is not only a stable capacitor with extremely low leakage, but it performs an additional function of blocking access to the insulator 55 of the fingers of one handling the housing 50. In prior units, the outer sides of corresponding insulators were so located that they could be touched by the fingers of those handling the units, and moisture deposited by such fingers on the surface of the insulators affected the accuracy of the units.

The other chopper unit, the one to the left of FIGS. 1, 3 and 4, and including the capacitor plates 35 and 64, would be similarly connected to another source of D.C. signals and to another electronic amplifier. The components of its coupling capacitor would be similar to those shown by FIG. 7, and those of its components seen on FIG. 1 are given the same reference characters as the corresponding components of FIG. 7 and of the coupling capacitor at the right side of FIG. 1 except that the subscript "A" is added.

The housing 50 is clamped by screws 90 to a base 91 which has a wafer 92 of electric insulation with terminals 93 for connecting the electromagnets and the vibratory plates to external circuits.

The electromagnets 21 and 22 would be connected in an oscillator circuit as disclosed in the co-pending application of Harry Reifel, Serial No. 810,755, filed May 4, 1959, which issued as Patent No. 3,020,455 on February 6, 1962, one of the electromagnets acting as a motor for driving the plates 35 and 36, and the other one of the electromagnets acting as a generator, current being induced in it by the vibrating plates, and regeneratively fed back to the oscillator circuit.

The non-magnetic strips 40 in the vibratory plates are for magnetically isolating the motor and generator halves of the plates as disclosed in said Reifel application. The magnetic shield 18 prevents transfer of energy directly from the motor electromagnet to the generator electromagnet. The strips 40 and the shield 18 thus prevent transfer of energy from the motor electromagnet to the generator electromagnet except through their pole-pieces and the respective halves of the vibratory plates.

The plates 35 and 36 vibrate out-of-phase so that their vibrations cancel out, and are not transmitted to the remainder of the chopper. This not only enables the previously used, massive and expensive mounts and housings to be replaced with less massive and expensive ones, but provides two chopper units in one assembly with many of the components common to the two units. Even where only one chopper unit is required, the vibration preventing feature alone is worthwhile, and one of the coupling capacitors and one of the fixed capacitor plates can be omitted so that while the chopper has two vibratory reeds, one can be used for the sole purpose of preventing the vibrations of the other vibratory plate from being transmitted to the chopper.

The permanent magnet bars 32 and 33 magnetize the vibratory plates 35 and 36 to opposite polarities. When A.C. is supplied from the associated oscillator circuit, to the one of the electromagnets 21 or 22 which is acting as a motor, the attraction between each of the vibratory plates and the adjacent end of the pole-piece of that electromagnet will either be increased or decreased depending upon the instantaneous polarity of the applied A.C. voltage, causing the plates 35 and 36 to vibrate in synchronism with the applied frequency, but out-of-phase. Voltage is induced in the electromagnet acting as a generator by the vibration of the vibratory plates, and this induced voltage is regeneratively fed back to the oscillator circuit as disclosed in said Reifel application.

Figure 2:
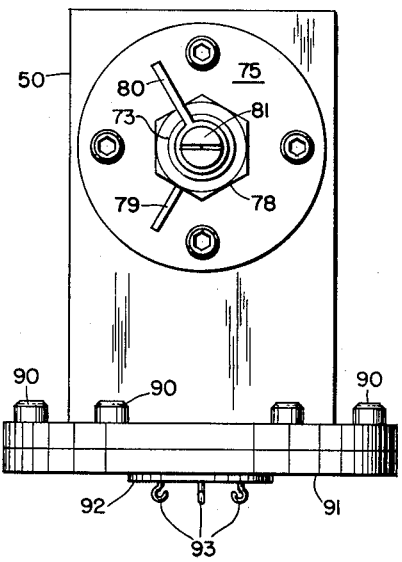
FIG. 2 is an end view of FIG. 1.

It may be desired to omit the coupling capacitors shown by FIGS. 1, 2, and 7, from the chopper. When this is done, nuts 98 and 98A shown on FIG. 3 by dashed lines, would be threaded on the sleeves 61 and 60 respectively, against the washers 59 and 59A respectively, in contact with the outer sides of the insulators 55 and 54 respectively.

What is claimed is:

1. A vibratory capacitor comprising a base, a plate of magnetic spring metal supported at one end to said base, the other end of said plate being free, a fixed capacitor plate opposite one side of said free end, electromagnetic means opposite the opposite side of said free end for vibrating said first mentioned plate, a housing around said plates, said electromagnetic means and said base, said housing having a circular opening in one side opposite said fixed plate, an electric insulator supported in said opening, a first coupling capacitor plate having a cylindrical portion opposite to, aligned with, and slightly spaced from said insulator, means supporting said coupling capacitor plate from said housing, a second coupling capacitor plate having a cylindrical portion with a diameter smaller than that of said first mentioned cylindrical portion, within and spaced from said first mentioned cylindrical portion, and means extending through the center of said insulator for supporting said fixed and said second coupling capacitor plates from said insulator and electrically connecting said fixed plate and said second coupling capacitor plate.

2. A vibrator capacitor comprising a non-magnetic metal frame having opposed, spaced-apart, parallel sides, a pair of spaced-apart, transversely aligned, electromagnets extending between and supported from said sides and having polepieces extending through said sides, a base of electric insulation secured to one end of said frame, a pair of plates of magnetic spring metal cantilever supported at corresponding ends to opposite sides of said base and having free ends opposite to and spaced from said polepieces, a non-magnetic housing extending around said frame, said plates and said base, a fixed capacitor plate spaced from the free end of one of said plates on the opposite side thereof from the polepieces it is opposite, means supporting said fixed plate from said housing, said first mentioned plates having aligned, non-magnetic inserts extending along their longitudinal centerlines, a magnetic shield plate aligned with said inserts and extending between said electromagnets, and means supporting said shield plate from the opposite end of said frame.

3. A vibratory capacitor as claimed in claim 2 in which there are provided spaced-apart permanent magnets between said polepieces and said base, aligned with said polepieces and attached to said base.

References Cited by the Examiner
UNITED STATES PATENTS

| | | | |
|---|---|---|---|
| 2,573,329 | 10/51 | Harris | 317—249 |
| 2,760,127 | 8/56 | Duncan | 317—250 |
| 2,817,796 | 12/57 | De Fligue | 317—165 |
| 2,831,937 | 4/58 | Foster | 317—147 |
| 3,020,455 | 2/62 | Reifel | 317—250 |
| 3,117,255 | 1/64 | Peterson | 317—165 |

JOHN F. BURNS, *Primary Examiner.*

SAMUEL BERNSTEIN, E. JAMES SAX, *Examiners.*